(12) United States Patent
Nishida et al.

(10) Patent No.: US 6,738,574 B2
(45) Date of Patent: May 18, 2004

(54) CAMERA SYSTEM AND ACCESSORY DEVICE

(75) Inventors: Takao Nishida, Saitama (JP); Mamoru Sakashita, Hachioji (JP); Masataka Ide, Hachioji (JP); Makoto Harada, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 10/352,621

(22) Filed: Jan. 28, 2003

(65) Prior Publication Data
US 2003/0142970 A1 Jul. 31, 2003

(30) Foreign Application Priority Data

Jan. 31, 2002 (JP) ........................................ 2002-024485
Jan. 31, 2002 (JP) ........................................ 2002-024486
Jan. 31, 2002 (JP) ........................................ 2002-024566

(51) Int. Cl.$^7$ .............................. G03B 7/26; G03B 5/00; G03B 15/05; G03B 17/18
(52) U.S. Cl. .................... 396/87; 396/155; 396/301; 396/519; 396/544; 396/266
(58) Field of Search ............... 396/266, 72, 85, 396/87, 155, 301, 529, 544

(56) References Cited

U.S. PATENT DOCUMENTS 4,814,812 A * 3/1989 Nakajima et al. ........... 396/227

FOREIGN PATENT DOCUMENTS

JP 01-221728 9/1989
JP 11-249217 A 9/1999

* cited by examiner

Primary Examiner—W. B. Perkey
(74) Attorney, Agent, or Firm—Frishauf, Holtz, Goodman & Chick, P.C.

(57) ABSTRACT

In a camera system according to the invention, a camera body and an interchangeable lens have respective identification data tables that are congruous with each other. As an appropriate data address is indicated to the interchangeable lens by the camera body, an identification data that is stored in the identification data storage section and corresponds to the indicated address is transmitted from the interchangeable lens to the camera body. The identification data judging section of the camera body compares the identification data transmitted back from the interchangeable lens and the identification data that is stored in the identification data storage section and corresponds to the address. As a result, it is determined if the dedicated accessory device is mounted on the camera body or not.

47 Claims, 9 Drawing Sheets

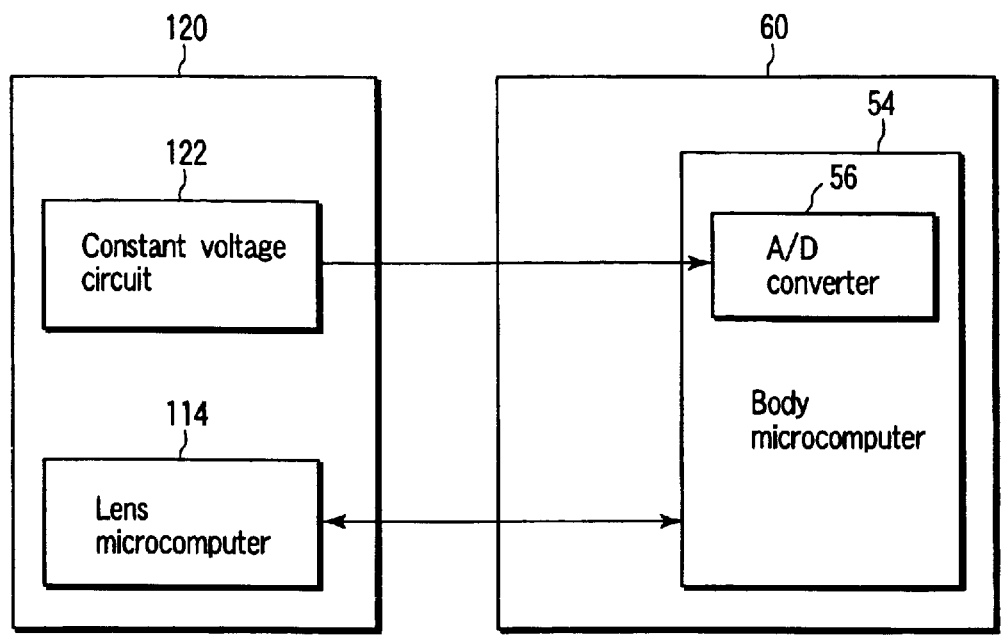
F I G. 9
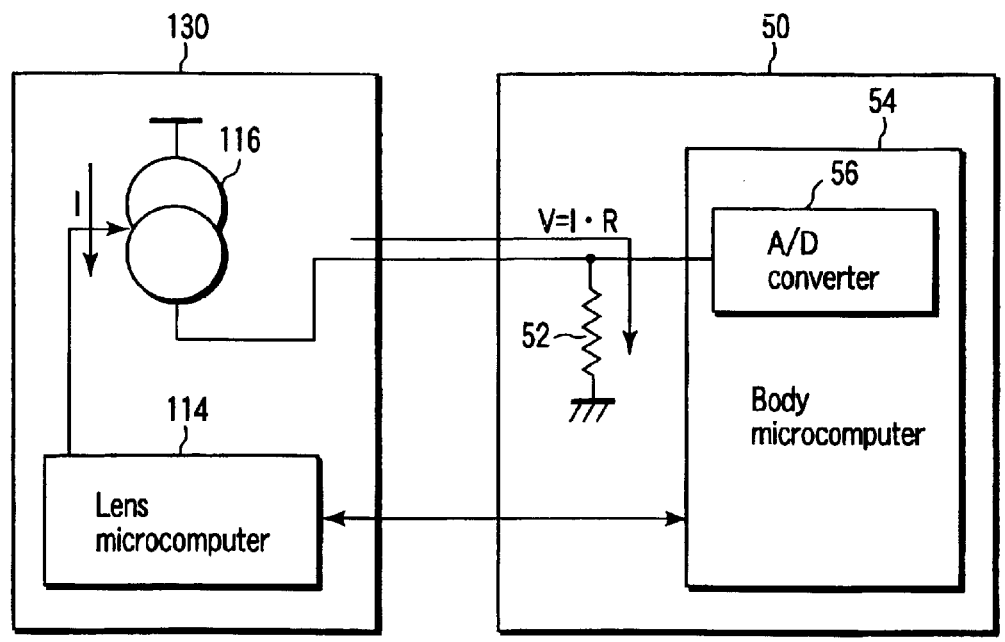
F I G. 10

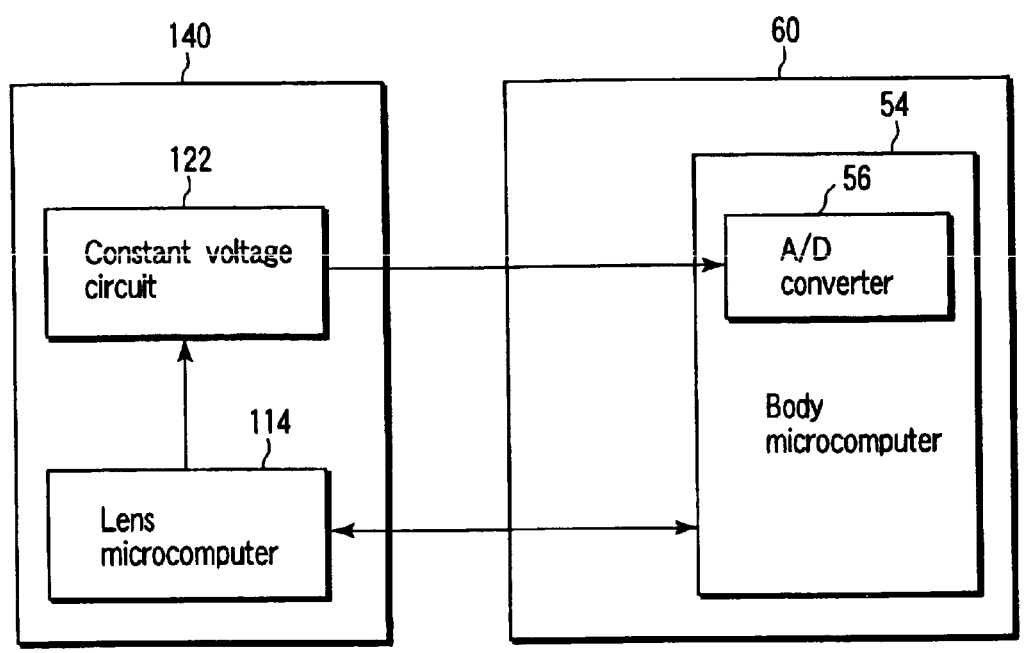
F I G. 11

US 6,738,574 B2

CAMERA SYSTEM AND ACCESSORY DEVICE

CROSS-REFERENCE TO RELATED APPLICATIONS

This application is based upon and claims the benefit of priority from the prior Japanese Patent Applications No. 2002-024485, filed Jan. 31, 2002, No. 2002-024486, filed Jan. 31, 2002; and No. 2002-024566, filed Jan. 31, 2002, the entire contents of all of which are incorporated herein by reference.

BACKGROUND OF THE INVENTION

1. Field of the Invention

This invention relates to a camera system comprising a camera body and camera accessories such as interchangeable lenses, to a camera body applicable to such a camera system and also to a camera accessory applicable to such a camera system.

2. Description of the Related Art

Generally, camera accessories including an interchangeable lens and a flash unit are releasably arranged in the camera body.

Then, both the camera body and any of the camera accessories refer to certain data stored in the camera accessory when the accessory is mounted on the camera body. It is possible to exploit the accessory maximally for performance by referring to the data. If the accessory is dedicated to the camera body on which it is mounted, the accessory can be exploited optimally for performance.

As pointed out above, a camera accessory that can be releasably arranged in the camera body can be exploited maximally for performance by referring to the data relating to it. In other words, if an accessory that is not designed so as to be dedicated to the camera body is mounted, the accessory will not be exploited satisfactorily for performance. If an accessory that is not dedicated to the camera body is mounted on the latter, the camera body can be functionally degraded to sometimes become damaged.

BRIEF SUMMARY OF THE INVENTION

In view of the above identified circumstances, it is therefore the feature of the invention to provide a camera system and a camera accessory device that can determine if the camera accessory that is mounted on the camera body is designed to be dedicated to it or not.

In the first feature of the present invention, the above feature is achieved by providing a camera system comprising:
  a camera body; and
  an accessory device to be releasably mounted on the camera body;
  the camera body having a camera side identification data table, a specifying section which specifies an appropriate data address to the accessory device and a judging section;
  the accessory device having an accessory device side identification data table congruous with the camera side identification data table and an transmitting section which transmits the identification data stored in the accessory device side identification data table at the data address specified by the specifying section to the camera body;
  the judging section being adapted to determine if a dedicated accessory is mounted or not by comparing the identification data transmitted back from the accessory device and the identification data stored in the camera side identification data table at the address corresponding to the data address.

In the second feature of the invention, there is provided an accessory device to be releasably mounted on a camera body having a functional feature of determining if an accessory device dedicated to the camera body is mounted on it or not, the accessory device comprising:
  an identification data table held congruous with the camera side identification data table provided in the camera body; and
  a transmitting section which selects an identification data in the identification data table and transmits it to the camera body in response to a specification by the camera body.

In the third feature of the invention, there is provided a camera body having a functional feature of determining if an accessory device designed to be dedicated to it is mounted on it or not, the camera body comprising:
  an identification data table congruous with the accessory side identification data table held by the accessory device;
  a specifying section which specifies an appropriate data address to the accessory device; and
  a judging section which determines if the dedicated accessory device is mounted on it or not by comparing the identification data corresponding to the specified data address of the accessory side identification data table and transmitted back from the accessory device according to the specification by the specifying section and the identification data stored in the camera side identification data table at the address corresponding to the data address.

In the fourth feature of the invention, there is provided a camera system comprising:
  a camera body; and
  an accessory device to be releasably mounted on the camera body;
  the camera body having a camera side memory section storing identification data congruous with the identification data stored in the accessory device, a detecting section which detects a predetermined operation by the user, a comparing section and a judging section;
  the accessory device having an accessory device side memory section storing identification data congruous with the identification data stored in the camera body;
  the comparing section being arranged in the camera body to receive an identification data from the accessory device when the predetermined operation is detected by the detecting section and compare the identification data with the corresponding camera side identification data;
  the judging section being adapted to judge if the dedicated accessory device is mounted on the camera body according to the result of the comparison by the comparing section.

In the fifth feature of the invention, there is provided a camera system of a combination of a camera body and an accessory device, the camera system comprising:
  the camera body having a communicating section which communicates with a specific accessory device according to a predetermined communication protocol and a discriminating section which determines if the accessory device coupled to it holds a predetermined quantity indicating a state of a pre-selected electric phenomenon; and the accessory device having a holding section which holds the predetermined quantity indicating the state of the pre-selected electric phenomenon in a form recognizable to the discriminating section of the camera body.

In the sixth feature of the invention, there is provided a camera body applicable to a camera system of a combination of a camera body and an accessory device, the camera body comprising:

a communicating section which communicates with a specific accessory device according to a predetermined communication protocol; and a discriminating section which determines if the accessory device coupled to it holds a predetermined quantity indicating a state of a pre-selected electric phenomenon.

In the seventh feature of the invention, there is provided an interchangeable lens applicable to a camera system of a combination of a camera body and an interchangeable lens, the interchangeable lens comprising:

a holding section which holds a predetermined quantity indicating the state of a pre-selected electric phenomenon in a form recognizable to a discriminating section arranged in the camera body.

In the eighth feature of the invention, there is provided a camera body applicable to a camera system of a combination of a camera body and an accessory device, the camera body comprising:

a communicating section which communicates with a specific accessory device according to a predetermined communication protocol;

a first matching determining section which acknowledges the possession of the first matching property of the mounted accessory device when communication is established by way of the communicating section;

a second matching determining section which detects a quantity indicating the state of an electric phenomenon held by the accessory device and acknowledges the possession of the second matching property of the accessory device when the result of the detection agrees with a predetermined quantity indicating the state of the pre-selected electric phenomenon; and a control section which determines the possession of the proper matching properties of the accessory device and allowing the camera to operate when the first matching determining section acknowledges the possession of the first matching property and the second matching determining section acknowledges the possession of the second matching property.

In the ninth feature of the invention, there is provided an interchangeable lens applicable to a camera system of a combination of a camera body and an interchangeable lens, the interchangeable lens comprising:

a lens side communicating section capable of communicating with the camera body according to a predetermined communication protocol, the interchangeable lens being acknowledged to possess the first matching property by the first matching determining section arranged in the camera body when communication is established between the lens side communicating section and the camera body; and a state-indicating quantity holding section which holds a quantity indicating the state of a pre-selected electric phenomenon, the quantity indicating the state of the pre-selected electric phenomenon being apt to be detected by the second matching determining section arranged in the camera body, the interchangeable lens being acknowledges to possess the second matching property by the second matching determining section when the detected quantity indicating the state of the electric phenomenon agrees with a predetermined quantity.

In the tenth feature of the invention, there is provided a camera system comprising:

a camera body; and an interchangeable lens to be combined with the camera body;

the camera body having a camera side communicating section, a first matching determining section, a second matching determining section and a control section;

the interchangeable lens having a lens side communicating section and a state-indicating quantity holding section;

the camera side communicating section being apt to communicate with a specific accessory device according to a predetermined communication protocol;

the lens side communicating section being apt to communicate with the camera side communicating section according to the predetermined communication protocol;

the first matching determining section being adapted to acknowledge the possession of the first matching property of the mounted interchangeable lens when communication is established between the camera side communicating section and the lens side communicating section;

the state-indicating quantity holding section being adapted to hold a quantity indicating the state of a pre-selected electric phenomenon;

the second matching determining section being adapted to detect a quantity indicating the state of an electric phenomenon held by the state-indicating quantity holding section and acknowledge the possession of the second matching property of the interchangeable lens when the result of the detection agrees with a predetermined quantity indicating the state of the pre-selected electric phenomenon;

the control section being adapted to determine the possession of the proper matching properties of the interchangeable lens and allow the camera to operate when the first matching determining section acknowledges the possession of the first matching property and the second matching determining section acknowledges the possession of the second matching property.

Additional features and advantages of the invention will be set forth in the description which follows, and in part will be obvious from the description, or may be learned by practice of the invention. The features and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 9 is a block diagram of the second embodiment of the invention, illustrating another example of arrangement that is adapted to detect and determine a voltage value as hardware-related information;

FIG. 10 is a block diagram of the second embodiment of the invention, illustrating still another example of arrangement that is adapted to detect and determine an electric current value as hardware-related information;

FIG. 11 is a block diagram of the second embodiment of the invention, illustrating still another example of arrangement that is adapted to detect and determine a voltage value as hardware-related information;

DETAILED DESCRIPTION OF THE INVENTION

Now, preferred embodiments of the present invention will be described by referring to the accompanying drawing.

Figure 1:
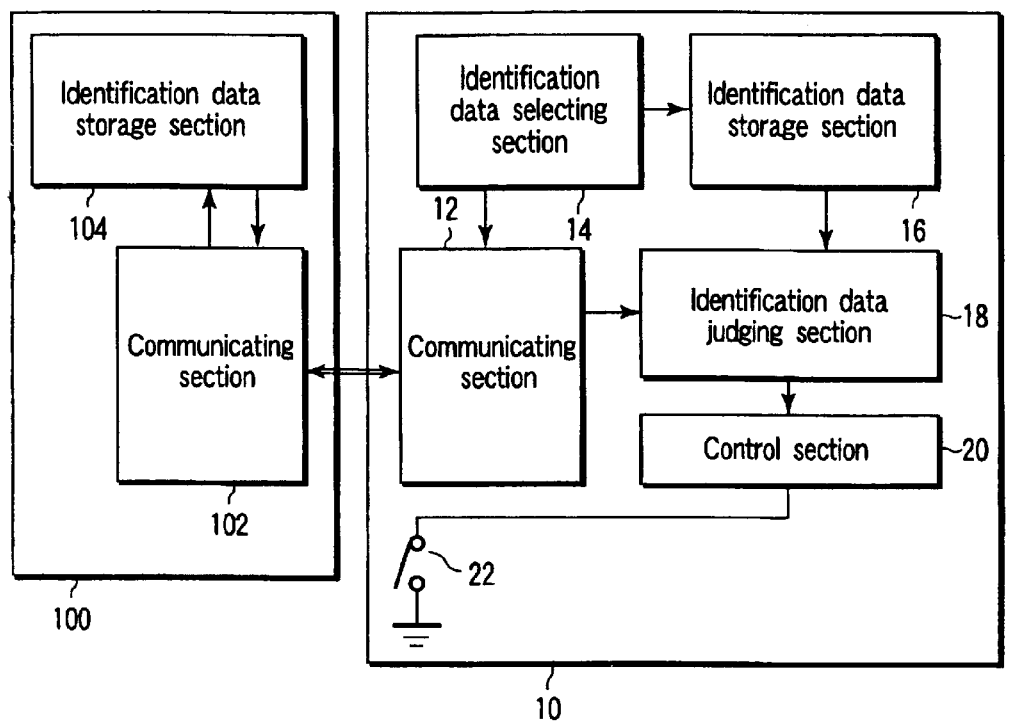
FIG. 1 is a functional block diagram of the first embodiment of camera system according to the invention, illustrating its configuration on the basis of signal flow.

FIG. 1 is a functional block diagram of the first embodiment of camera system according to the invention, illustrating its configuration in terms of signal flow.

Referring to FIG. 1, the camera system comprises a camera body 10 and an interchangeable lens 100, which is a camera accessory releasably mounted on the camera body 10.

The camera body 10 includes a communicating section 12 to be used for data communication with the interchangeable lens 100, an identification data selecting section 14, an identification data storage section 16, an identification data judging section 18, a control section 20 and a lens mounting/releasing switch (SW) 22.

On the other hand, the interchangeable lens 100 is releasably mounted on the camera body 10 and includes a communicating section 102 for communicating with the camera body 10 and an identification data storage section 104.

The communicating section 12 communicates with the interchangeable lens 100. As will be described in detail, it transmits a group number and an address as identification data necessary for identifying the interchangeable lens 100 and receives identification data corresponding to the group number and the address from the interchangeable lens 100.

The identification data selecting section 14 is adapted to select the group number and the address as identification data. The identification data storage section 16 sorts out identification data by way of group numbers and addresses and stores them.

The identification data judging section 18 is adapted to compare the identification data relating to a group number and an address and input from the communicating section 12 and the identification data relating to a group number and an address and read out from the identification data storage section 16 and determine if they agree with each other or not.

The first matching determining means comprises the identification data selecting section 14, the identification data storage section 16 and the identification data judging section 18.

The lens mounting/releasing switch 22 is a switch for detecting if the interchangeable lens 100 is mounted on the camera body 10 or not.

The control section 20 allows the camera to operate properly when a matching interchangeable lens 100 is coupled to the camera body or prohibits the latter from operating when an interchangeable lens 100 that is not matching the camera body is coupled to the latter in response to the result of the detection of the lens mounting/releasing switch 22 and that of the judgment of the identification data judging section 18.

Note that, the control section 20 comprehensively controls only the camera body 10 when an interchangeable lens 100 is not coupled to the camera body 10, whereas it comprehensively controls the entire camera system including an interchangeable lens 100 when the latter matches and is coupled to the camera body 10.

The communicating section 102 of the interchangeable lens 100 operates to read the identification data corresponding to the group number and the address received from the communicating section 12 of the camera body 10 out of the identification data storage section 104 and transmits it back to the communicating section 12 of the camera body 10.

The identification data storage section 104 sorts out identification data by way of group numbers and addresses and stores them.

Both the identification data storage section 16 of the camera body 10 and the identification data storage section 104 of the interchangeable lens 100 store identification data that are common to the camera body 10 and the interchangeable lens 100 and hence same and identical. An identification data is produced by using a plurality of identification data tables. For example, an identification data may be produced by using three random identification data tables as shown in FIG. 2.

Figure 2:
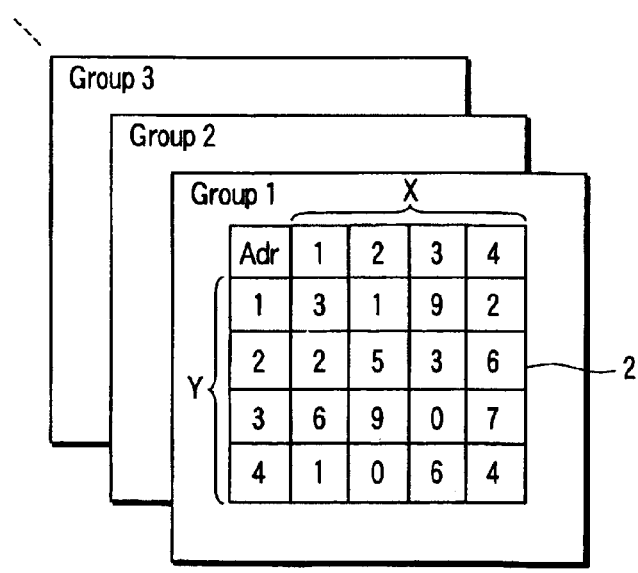
FIG. 2 is a schematic illustration of identification data tables that may be stored in the identification data storage section 16 and the identification data storage section 104 of FIG. 1.

FIG. 2 is a schematic illustration of identification data tables. As descried above, the identification data stored in the identification data storage section 16 and the corresponding data stored in the identification data storage section 104 are sorted into groups according to group numbers including Group 1, Group 2, Group 3 and so on. Additionally, the data are stored in the two-dimensional regions of each of the groups and the two-dimensional regions are defined, for instance, by horizontal Addresses X and vertical Addresses Y. Thus, the tables look like code tables.

In the instance of FIG. 2, the values of vertical Addresses Y are found within a range between 1 and 4. Similarly, the values of horizontal Addresses X are found within a range between 1 and 4. Thus the identification data is stored at 4×4=16 addresses that are expressed by combinations of vertical and horizontal Addresses (X, Y).

For example, if "1" is specified for Group (out of Group 1, Group 2 and Group 3 in FIG. 2) of the identification data tables and "2" and "2" are specified respectively for Address X and Address Y, an identification data of "5" is defined. The identification data selecting section 14 specifies (selects) the group number of the identification data tables and Addresses (X, Y).

The data defined by means of the specified group number and address is then sent to the identification data judging section 18. As described above, the identification data judging section 18 judges if the data selected in a manner as described above and stored in the identification data storage section 16 and the data stored in the identification data storage section 104 of the interchangeable lens 100 and transmitted to it by way of the communicating sections 102 and 12 agree with each other or not.

Note again that the identification data stored in the identification data storage section 104 of the interchangeable lens 100 is selected by using the group number and the addresses selected by the identification data selecting section 14 of the camera body 10.

The control section 20 controls the operation of the camera according to the judgment of the identification data judging section 18. The control section 20 is coupled to the lens mounting/releasing switch (SW) 22 for detecting if the interchangeable lens 100 is mounted or released. Thus, the control section 20 is notified of the timing at which the interchangeable lens 100 is mounted or released.

Now, the operation of selecting an identification data stored in the identification data storage section 16 will be described below.

For the operation of selecting an identification data, the group number and the addresses are sequentially incremented. For example, if "1" is specified for Group of the identification data tables and "1" and "1" are specified respectively for Address X and Address Y for the first round, "2" is specified for Group and "2" and "2" are specified respectively for Address X and Address Y, although an identification data may be selected in a different way as will be discussed below.

First, an identification data may be switched to another as a function of time. For example, the groups and the addresses of the identification data tables may be switched to other ones every day.

Second, an identification data may be switched to another as a function of the data stored in the interchangeable lens 100. For example, an identification data may be selected by referring to the number specifically allocated to the lens or to the type of the lens.

Third, an identification data may be switched to another as a function of the data stored in the camera body 10. For instance, the data may be stored when the camera body is manufactured.

Fourth, an identification data may be selected by using a random number. It may be so arranged that the camera body 10 generates a random number each time the camera is operated and transmits the random number to the interchangeable lens 100.

Of the above described identification data storage section 16 and the identification data storage section 104, a writable memory may be used at least for the identification data storage section 104.

Now, the processing operation of the above described embodiment of camera system will be described by referring to the flow charts of FIGS. 3 and 4.

Firstly, the processing operation of the camera body 10 will be described by referring to the main flow chart of the camera body 10.

As the camera body 10 is powered typically by means of a battery (not shown) to start the sequence of the processing operation. Firstly, the camera system is initialized for operation in Step S1. The initialization may include selection of a port. Then, in Step S2, it is determined if an interchangeable lens 100 is mounted on the camera body 10 or not according to the result of the detecting operation of the lens mounting/releasing switch 22.

If it is determined in Step S2 that an interchangeable lens 100 is not mounted on the camera body 10, the processing operation proceeds to Step S3, in which a process without a lens is conducted. Subsequently, the processing operation goes back to Step S2. If, on the other hand, it is determined in Step S2 that an interchangeable lens 100 is mounted, the processing operation proceeds to Step S4.

In Step S4, it is determined if the interchangeable lens 100 is newly mounted on the camera body 10 (in other words changed) or it has been mounted for sometime. If it is determined that the interchangeable lens 100 is newly mounted, a specific processing operation of identifying the lens is conducted in steps starting from Step S5. If, on the other hand, it is determined that the interchangeable lens 100 has been mounted for sometime, the processing operation proceeds to Step S14.

In Step S5, an identification data is selected. More specifically, an identification data stored in the identification data storage section 16 is selected by the identification data selecting section 14 in the camera body 10. To do this, a group number and an address data are specified by means of the identification data tables as shown in FIG. 2.

Subsequently, in Step S6, the group number of the identification data selected in Step S5 is transmitted from the camera body 10 to the interchangeable lens 100. This step, or Step S6, corresponds to Step S24 in the flow chart of FIG. 4, which will be described in detail hereinafter.

Then, in Step S7, Addresses X and Y of the identification data selected in Step S5 are transmitted from the camera body 10 to the interchangeable lens 100 similarly to Step S6. Again, this step, or Step S7, corresponds to Step S25 in the flow chart of FIG. 4, which will also be described in detail hereinafter.

Thereafter, in Step S8, the identification data transmitted from the interchangeable lens 100 in response to the above described identification data transmitted in Steps S6 and S7 is received by the camera body 10. Then, the received identification data is judged in Step S9. More specifically, the identification data stored in the identification data storage section 16 of the camera body 10 is compared with the identification data transmitted from the interchangeable lens 100 in Step S8.

In Step S10, it is determined if the two identification data agree with each other or not. If the identification data do not agree with each other, the processing operation proceeds to Step S11, where the interchangeable lens 100 is judged to be no good (NG). Then, any subsequent operation for driving the camera is prohibited in Step S12. Subsequently, the processing operation proceeds to Step S13, where a damage processing operation is conducted so as to make the camera system reject any user operation.

If, on the other hand, it is determined in Step S10 that the identification data agree with each other, the processing operation proceeds to Step S14, where the interchangeable lens 100 is judged to be OK. Then, the camera system is driven to operate properly in Step S15.

Then, in Step S16, it is determined if the interchangeable lens 100 is released or not. The processing operation goes back to Step S2 when it is determined that the interchangeable lens 100 is released, whereas the processing operation proceeds to Step S17 when it is determined that the interchangeable lens 100 is not released.

In Step S17, it is determined if the operation of identifying the interchangeable lens 100 is to be conducted or not. This operation of identifying the lens will be conducted in response to a user's manual operation of turning on the power switch, the release switch or the like.

If it is determined that the operation of identifying the lens is to be conducted, the processing operation moves to Step S5 and the succeeding steps are followed. If, on the other hand, it is determined that the operation of identifying the lens is not to be conducted, the processing operation goes to Step S15 to follow the procedure of the normal processing operation. Thereafter, the processing operation proceeds to Step S16 and the ordinary processing loop is repeatedly followed except when the processing operation for releasing the lens or that of checking the lens is conducted in Step S16 or S17, whichever appropriate.

Figure 4:
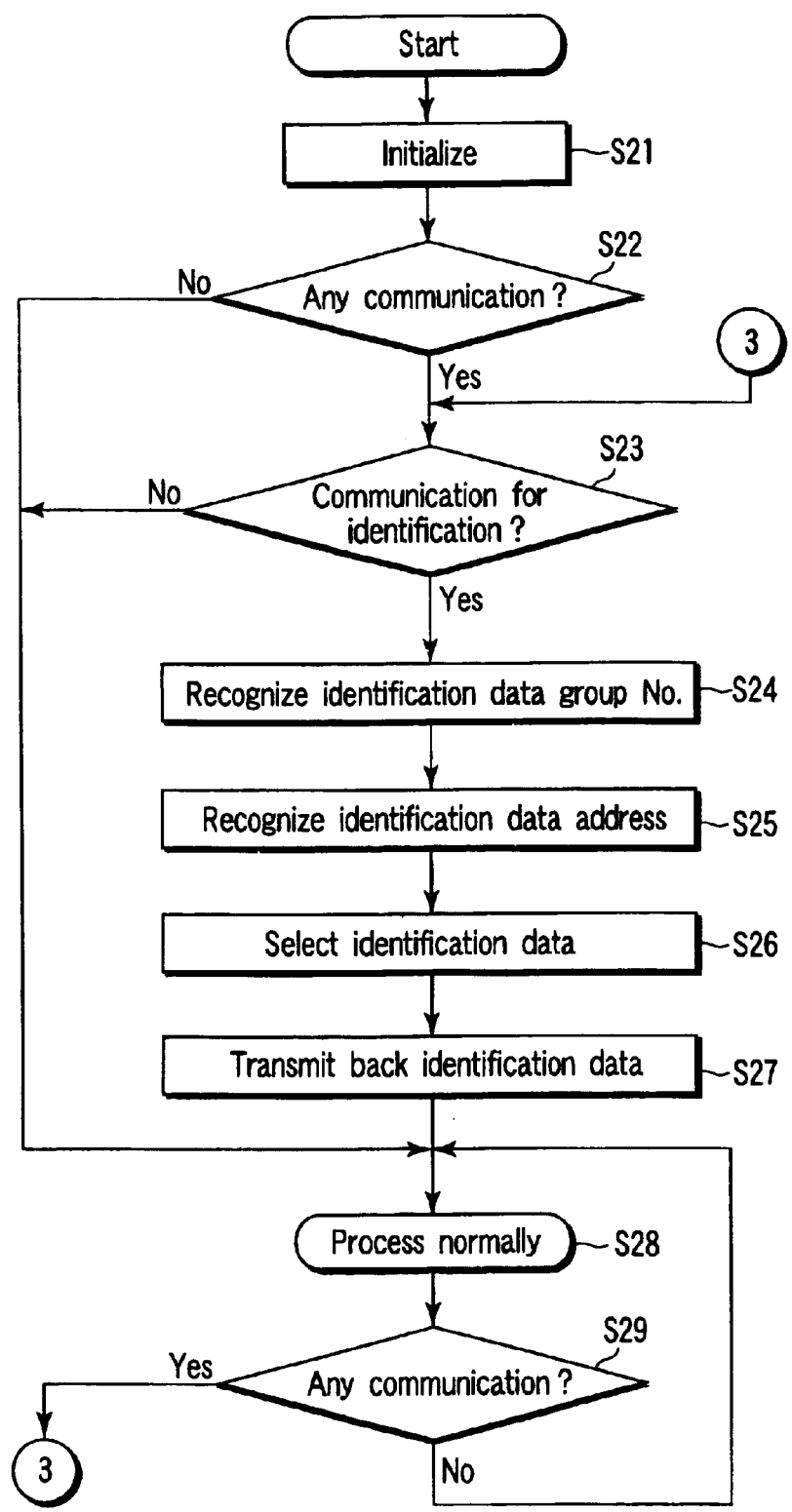
FIG. 4 is a flow chart of the operation of the interchangeable lens 100 of the first embodiment of camera system according to the invention.

Now, the processing operation of the interchangeable lens 100 will be described by referring to the main flow chart of the interchangeable lens 100 as shown in FIG. 4.

In this sequence, firstly, the interchangeable lens 100 is initialized for operation in Step S21. The initialization may typically include selection of a port. Then, a communication check is conducted in Step S22. A communication check is an operation of the communicating section 102 in the interchangeable lens 100 for checking if there is a request for communication issued from the camera body 10 or not. The processing operation proceeds to Step S28 when there is no request for communication, whereas it proceeds to Step S23 when there is a request for communication.

Then, in Step S23, it is determined if there is a transmission for identification data or not. If it is determined in Step S23 that there is no transmission for identification data, the processing operation proceeds to Step S28. If, on the other hand, it is determined in Step S23 that there is a transmission for identification data, the processing operation proceeds to Step S24.

Figure 3:
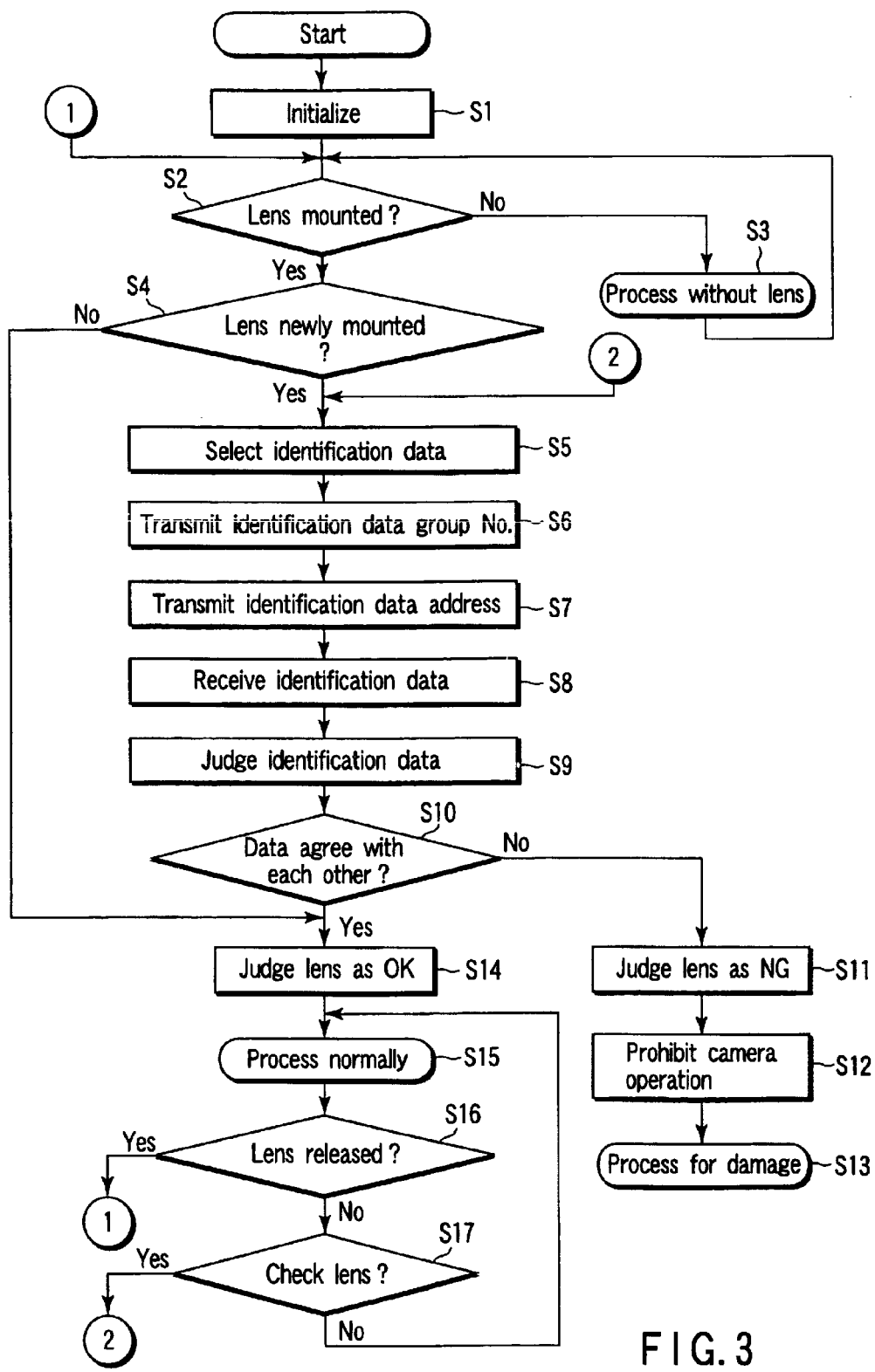
FIG. 3 is a flow chart of the operation of the camera body 10 of the first embodiment of camera system according to the invention.

In Step S24, the group number of the identification data transmitted from the camera body 10 in Step S6 of the flow chart of FIG. 3 is recognized by the interchangeable lens 100. Similarly, in Step S25, Addresses X and Y of the identification data transmitted from the camera body 10 in Step S7 of the flow chart of FIG. 3 is recognized by the interchangeable lens 100.

Then, in Step S26, an identification data stored in the identification data storage section 104 in the interchangeable lens 100 is selected by means of the above described group number and Addresses X and Y. Thereafter, in Step S27, the identification data selected in Step S26 is transmitted back from the interchangeable lens 100 to the camera body 10.

Subsequently, in Step S28, the ordinary processing operation of the interchangeable lens 100 is conducted. Then, in Step S29, it is determined if there is a communication or not. If it is determined that there is a communication, the processing operation proceeds to Step S23 for the above described operation of communication check. If, on the other hand, it is determined that there is no communication, the processing operation proceeds to Step S28 for the ordinary processing loop.

While any subsequent operation for driving the camera is prohibited when the lens is judged to be NG in Steps S11 and S12 in the flow chart of FIG. 3 in the above description of the embodiment, the embodiment is by no means limited to such an arrangement. For example, it may alternatively be so arranged that the fact that the lens is NG is notified instead of prohibiting the operation of driving the camera. Still alternatively, the normal procedure of the processing operation may be followed, while limiting the use of some of the functional features.

The damage processing operation in Step S13 of the flow chart of FIG. 3 may be a halt of the operation of the interchangeable lens 100.

While both the identification data storage section 16 of the camera body 10 and the identification data storage section 104 of the interchangeable lens 100 store identification data that are common to the camera body 10 and the interchangeable lens 100 and hence same and identical in the above description of the embodiment, the identification data stored in the storage sections may not necessarily be so if the identification data stored in the identification data storage section 104 of the interchangeable lens 100 at least include the identification data stored in the identification data storage section 16 of the camera body 10.

While the camera accessory that can be releasably mounted on the camera body 10 is an interchangeable lens 100 in the above description of the embodiment, the interchangeable accessory may alternatively be a flash unit, a battery pack or something else.

While the identification data of the camera body 10 and that of the interchangeable lens 100 are collated (to recognize the lens) when the lens is changed in the above description of the first embodiment, it may alternatively be so arranged that the user can select the timing for collating the two identification data.

As described above, it is now possible to determine if the camera accessory mounted on the camera body of the first embodiment of the present invention is one that is designed so as to be dedicated to the camera body or not.

Now, the second embodiment of the invention will be described below.

The second embodiment is a camera system comprising a camera body and an interchangeable lens, in which the proper applicability of the interchangeable lens to the camera body can be precisely determined. The second embodiment is also designed to provide a camera body and an interchangeable lens that are applicable to the camera system.

Figure 5:
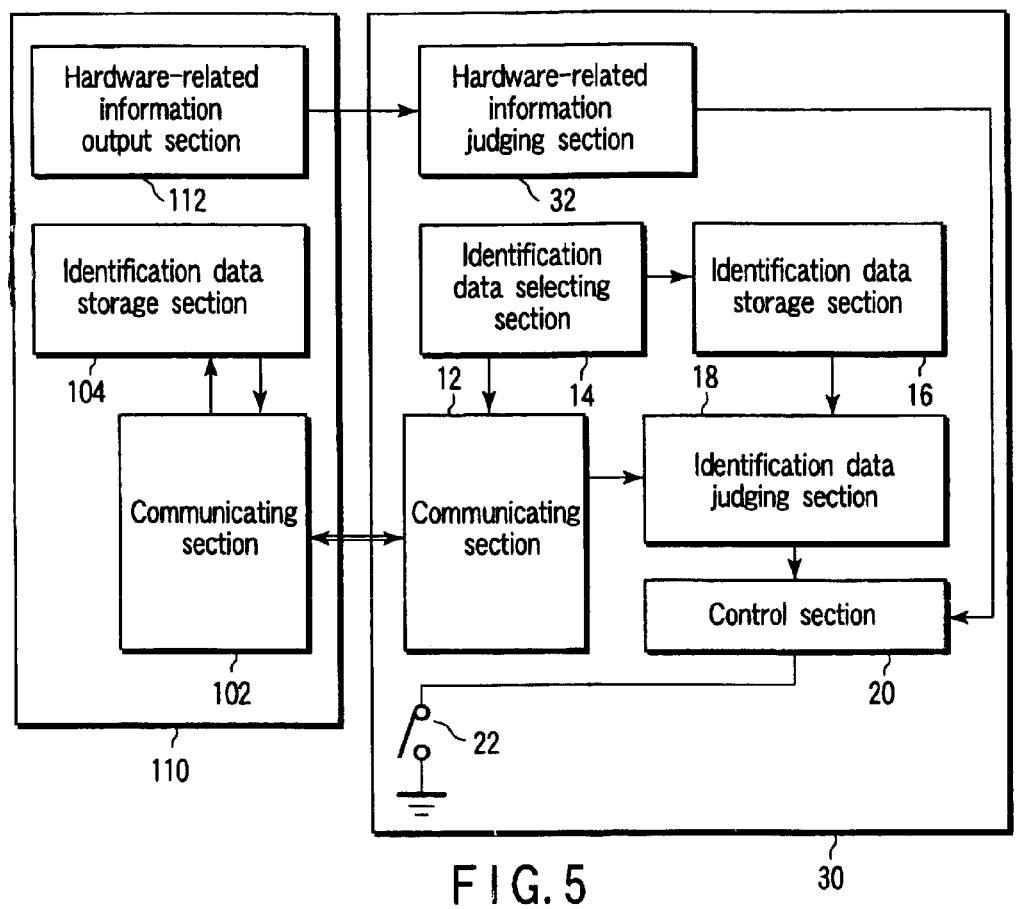
FIG. 5 is a block diagram of the second embodiment of camera system according to the invention, illustrating its configuration.

FIG. 5 is a block diagram of the second embodiment of camera system according to the invention, illustrating its configuration. The components similar or identical to those of the first embodiment are designated at the same reference numerals and will not be described in detail.

The camera system comprises a camera body 30 and an interchangeable lens 110 that can be releasably mounted on the camera body 30 by way of a lens mount or the like.

The camera body 30 includes a communicating section 12, an identification data selecting section 14, an identification data storage section 16, an identification data judging section 18, a control section 20, a lens mounting/releasing switch (SW) 22 and a hardware-related information judging section 32.

On the other hand, the interchangeable lens 110 is releasably mounted on the camera body 30 and includes a communicating section 102 for communicating with the camera body 30, an identification data storage section 104 and a hardware-related information output section 112.

The hardware-related information judging section 32 is means for judging the hardware-related information output from the interchangeable lens 110 when the interchangeable lens 110 is mounted on the camera body 30. It operates as second matching determining means. The control section 20 allows the camera to operate properly when a matching interchangeable lens 110 is connected to the camera body or prohibits the latter from operating when an interchangeable lens 110 that is not matching the camera body is connected to the latter in response to the result of the judgment of the hardware-related information judging section 32, that of the detection of the lens mounting/releasing switch 22 and that of the judgment of the identification data judging section 18.

The hardware-related information output section 112 is designed to operate as state-indicating quantity holding means that is adapted to output hardware-related information to the hardware-related information judging section 32 of the camera body 30.

The hardware-related information is output as quantity indicating the state of the electric phenomenon selected to maintain a specific relationship with an attribute of the interchangeable lens 110. The attribute of the interchangeable lens 110 may be its focal length, a physical quantity that is provided in advance in it and can be used to identify it, or its product number.

The quantity indicating the state of the electric phenomenon may be an electric current value, a voltage value, an electric resistance value, an electric capacitance value, a frequency value or the duty factor of an electric value that changes cyclically.

Now, the arrangement for judging hardware-related information will be described by referring to FIGS. 6 through 9.

Figure 6:
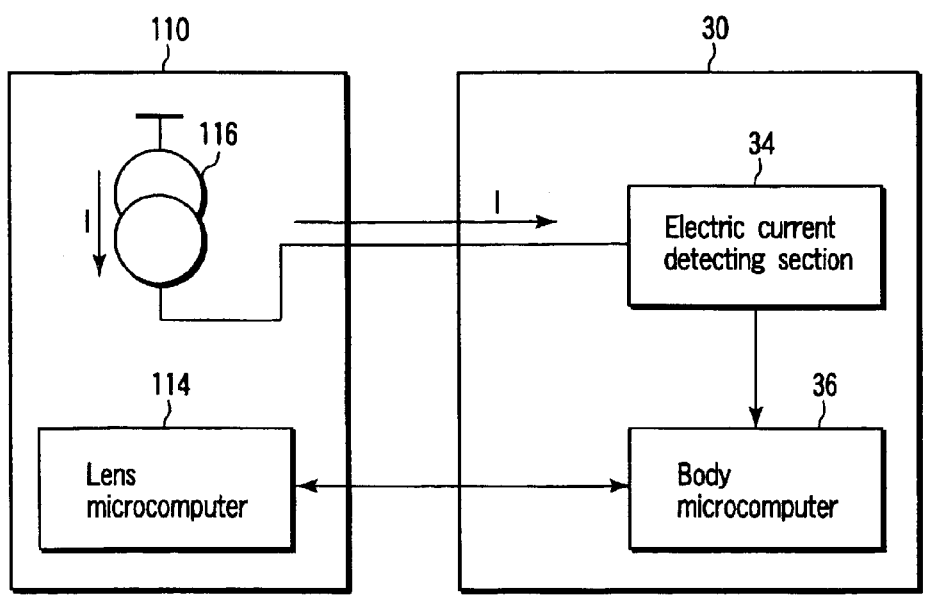
FIG. 6 is a block diagram of the second embodiment of the invention, illustrating an example of arrangement that is adapted to detect and determine an electric current value as hardware-related information.

FIG. 6 is a block diagram illustrating an example of arrangement that is adapted to detect and determine an electric current value as hardware-related information.

The interchangeable lens 110 comprises a lens microcomputer 114 that includes a communicating section 102 and an identification data storage section 104 and a constant current source 116 that corresponds to the hardware-related information output means 112 and operates as state-indicating quantity holding means. The constant current source 116 is adapted to output a constant current I showing a value that corresponds to the attribute of the interchangeable lens 110.

More specifically, the constant current source 116 outputs a constant electric current I that represents the type of the interchangeable lens, e.g., the 28–105 mm zoom lens or the 100 mm macro-lens or the ID number or the product number (or part of the number) of the interchangeable lens that is stored in the EEPROM or the like (not shown) at the time when the interchangeable lens is manufactured.

On the other hand, the camera body 30 comprises an electric current detecting section 34 that operates as second matching determining means and corresponds to the hardware-related information judging section 32 and a body microcomputer 36 that includes the communicating section 12, identification data selecting section 14, identification data storage section 16, identification data judging section 18 and control section 20.

The electric current detecting section 34 is adapted to detect the value of the constant electric current I output from the constant current source 116 and output the detected value. The body microcomputer 36 determines if the connected interchangeable lens 110 matches the camera body on the basis of the electric current value detected by the electric current detecting section 34 and, if it is determined that the interchangeable lens 110 matches the camera body, it also operates as communicating means, coding means and first matching determining means so as to determine the attribute of the interchangeable lens 110 and perform a control operation suited for the interchangeable lens 110 on the basis of the determined attribute.

The body microcomputer 36 has a data base that is necessary for the attribute of the matching interchangeable lens 110. Additionally, the body microcomputer 36 determines if the electric current value detected by the electric current detecting section 34 agrees with one of the electric current values stored in the data base or not and then if the connected interchangeable 110 is a matching lens or not on the basis of agreement or disagreement. Furthermore, the body microcomputer 36 determines the attribute of the connected interchangeable lens 110 by collating the electric current value with the values stored in the data base.

Figure 7:
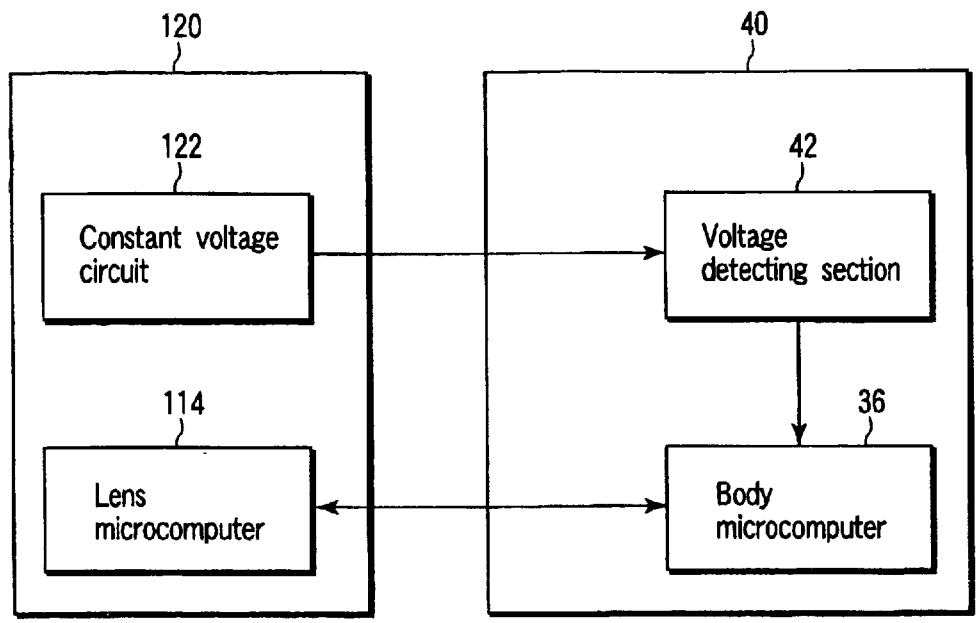
FIG. 7 is a block diagram of the second embodiment of the invention, illustrating an example of arrangement that is adapted to detect and determine a voltage value as hardware-related information.

FIG. 7 is a block diagram illustrating an example of arrangement that is adapted to detect and determine a voltage value as hardware-related information.

The interchangeable lens 120 comprises a constant voltage circuit 122 in place of the constant current source 116 of FIG. 6. The constant voltage circuit 122 outputs a constant voltage V showing a voltage value that represents its own attribute. It corresponds to the hardware-related information output section 112 and operates as state-indicating quantity holding means.

On the other hand, the camera body 40 comprises a voltage detecting section 42 in place of the electric current detecting section 34 of FIG. 6. The voltage detecting section 42 is adapted to detect the value of the constant voltage V output from the constant voltage circuit 122 and output the detected value. It corresponds to the hardware-related information judging section 32 and operate as second matching determining means.

Since the arrangement of FIG. 7 is identical with that of FIG. 6 except that a voltage value is detected as hardware-related information. It will not be described any further.

Figure 8:
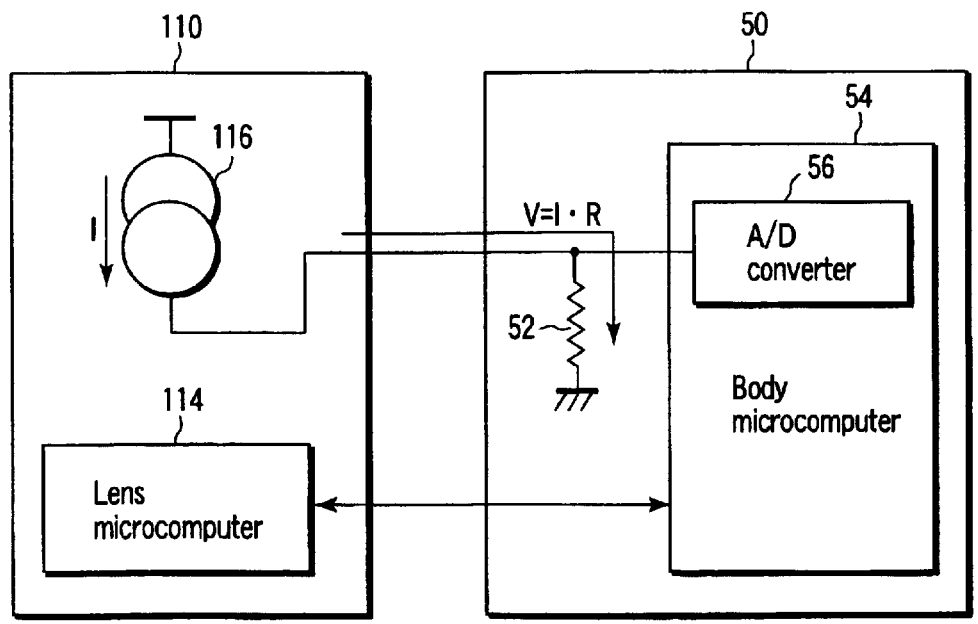
FIG. 8 is a block diagram of the second embodiment of the invention, illustrating another example of arrangement that is adapted to detect and determine an electric current value as hardware-related information.

FIG. 8 is a block diagram illustrating another example of arrangement that is adapted to detect and determine an electric current value as hardware-related information.

The interchangeable lens 110 of FIG. 8 is same as the one illustrated in FIG. 6.

On the other hand, the camera body 50 comprises a resistor 52 and a body microcomputer 54 in place of the electric current detecting section 34 and the body microcomputer 36 of FIG. 6.

The resistor 52 has a resistance value R and operates as part of the second matching determining means arranged on the input line of the constant electric current I output from the constant current source 116 and between the constant current source 116 and the ground. The body microcomputer 54 has an A/D converter 56 in the inside thereof that operates as second matching determining means for detecting the voltage value V=I×R produced by the resistor 52 and converting the detected voltage into a digital data. Since the arrangement of FIG. 8 is otherwise identical with that of FIG. 6, it will not be described any further.

FIG. 9 is a block diagram illustrating another example of arrangement that is adapted to detect and determine a voltage value as hardware-related information.

The interchangeable lens 120 of FIG. 9 is same as the one illustrated in FIG. 7.

On the other hand, the camera body 60 comprises a body microcomputer 54 that includes an A/D converter 56 similar to the one described above by referring to FIG. 8 but does not comprise any voltage detecting section 42 described above by referring to FIG. 7. Since the arrangement of FIG. 9 is otherwise identical with that of FIG. 7, it will not be described any further.

FIG. 10 is a block diagram illustrating still another example of arrangement that is adapted to detect and determine an electric current value as hardware-related information.

With the arrangement of FIG. 10, hardware-related information is used only to detect if the interchangeable lens 130 matches the camera body 50. In other words, it is not used to detect the focal length or some other attribute of the interchangeable lens 130.

The body microcomputer 54 has a coding section (not shown) in the inside thereof. It prepares a command for indicating the electric current value output from the interchangeable lens 130 connected to it and encodes the command by means of the coding section. Then, it transmits the coded command to the lens microcomputer 114 of the interchangeable lens 130.

The lens microcomputer 114 of the interchangeable lens 130 has a decoding section (not shown) in the inside thereof (the decoding section is included in the communicating section 102 if the interchangeable lens has a configuration corresponding to that of FIG. 5). Thus, it decodes the coded command it receives from the body microcomputer 54 and sets the electric current I output from the constant current source 116 to a value specified by the decoded command. In other words, the constant current source 116 of the interchangeable lens 130 is variable.

Since the arrangement of FIG. 10 is otherwise identical with that of FIG. 8, it will not be described any further.

With the above described arrangement, the body microcomputer 54 detects the electric current value of the electric current I output from the interchangeable lens 130. If the interchangeable lens 130 is a matching one or not is determined depending on if the detected electric current value agrees with the one specified by the body microcomputer 54 by way of the command it issued.

In other words, for the interchangeable lens 130 to prove that it matches the camera body 50, the interchangeable lens 130 has to have a decoding section that corresponds to the coding section of the camera body 50 and a means for outputting the electric current value of the electric current I that corresponds to the command from the camera body 50.

FIG. 11 is a block diagram illustrating still another example of arrangement that is adapted to detect and determine a voltage value as hardware-related information.

In this example, as in the case of the example of FIG. 10, hardware-related information is used only to detect if the interchangeable lens 140 matches the camera body 60. In other words, it is not used to detect the focal length or some other attribute of the interchangeable lens 140.

The body microcomputer 54 has a coding section (not shown) in the inside thereof. It prepares a command for indicating the voltage value output from the interchangeable lens 140 connected to it and encodes the command by means of the coding section. Then, it transmits the coded command to the lens microcomputer 114 of the interchangeable lens 140.

The interchangeable lens 140 has a decoding section (not shown) in the inside thereof. Thus, it decodes the coded command it receives from the body microcomputer 54 and sets the voltage V output from the constant voltage circuit 122 to a value specified by the decoded command. In other words, the constant voltage circuit 122 of the interchangeable lens 140 is variable.

The arrangement of FIG. 11 is identical to that of FIG. 6 in any other aspects. The body microcomputer 54 determines the applicability of the interchangeable lens 140 in the same way as in the case explained with reference to FIG. 10. The process of determining the applicability will not described.

The communication including encoding and decoding performed in the second embodiment may be realized by using such identification data utilized in the first embodiment.

Figure 12:
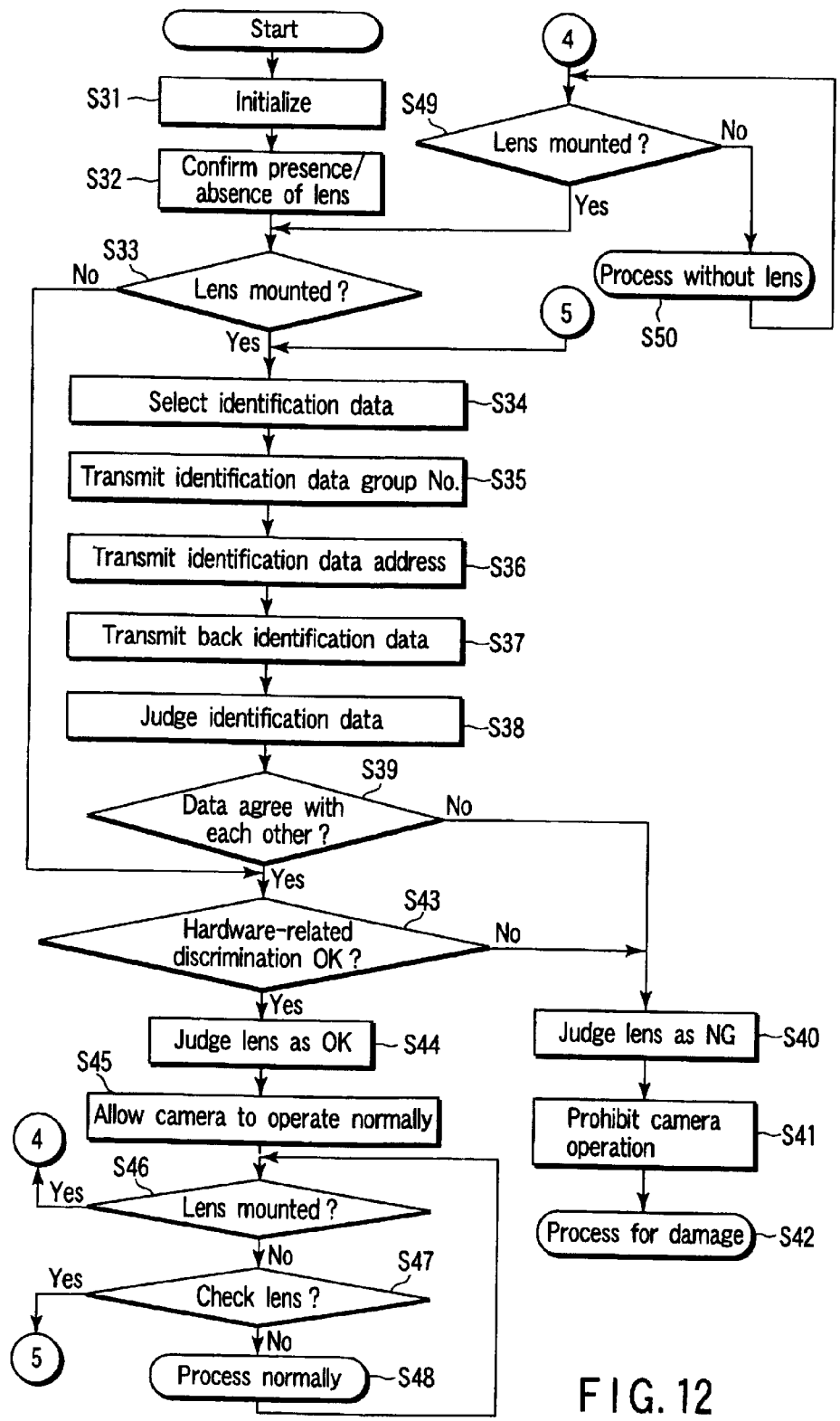
FIG. 12 is a flow chart of the operation of the camera body of the second embodiment of the invention.

Now, the operation of the camera body 30 of the second embodiment will be described by referring to the flowchart of FIG. 12.

As the camera system is operated, it is initialized in Step S31. The initialization includes checks of components and selections of initial values for them. Then, in Step S32, it is determined if an interchangeable lens 110 is mounted on the camera body 30 or not according to the result of the detecting operation of the lens mounting/releasing switch 22. In Step S33, it is determined if an interchangeable lens 110 is newly mounted on the camera body 30 or not according to the result of the detecting operation.

If it is determined that the interchangeable lens 110 is newly mounted on the camera body 30, it is confirmed if the interchangeable lens 110 is a matching lens or not by means of a communication protocol as described below before starting communications and other operations.

If it is determined that an interchangeable lens 110 is newly mounted on the camera body 30, the processing operation proceeds to Step S34, where a group number and Addresses X and Y are specified to select an identification data typically by generating random numbers.

Then, in Step S35, the group number of the identification data is transmitted to the communicating section 102 of the interchangeable lens 110 by way of the communicating section 12. Thereafter, in Step S36, Addresses X and Y of the identification data are transmitted. In the next step of S37, the camera body 30 waits for the identification data transmitted back from the interchangeable lens 110 and, as the identification data is transmitted back, it is received by way of the communicating section 12 in Step S38.

Then, in Step S39, the identification data judging section 18 compares the identification data including the group number and Addresses X and Y and read out from the identification data storage section 16 and the identification data received from the interchangeable lens 110. According to the result of the comparison, the section 18 determines if they agree with each other or not.

If the two identification data do not agree with each other, the processing operation proceeds to Step S40, where it is determined that the interchangeable lens 110 is not properly matching. As a result, any operation of the camera is prohibited in Step S41 and the processing operation proceeds to Step S42, in which a predetermined damage routine is conducted. With this arrangement, the camera system does not work for any image pickup operation if an interchangeable lens 110 that does not match the camera body 30 is mounted on the latter.

If, on the other hand, it is determined in Step S33 that no interchangeable lens 110 is mounted on the camera body 30 or the two identification data agree with each other in Step S39, the processing operation proceeds to Step S43. Then, the hardware-related information judging section 32 determines if the interchangeable lens 110 mounted on the camera body 30 is a matching one or not in a manner as described above by referring to the corresponding one of FIGS. 6 through 11.

If it is determined in Step S43 that the interchangeable lens 110 is not a matching one, the processing operation goes back to Step S40. If, on the other hand, it is determined that the interchangeable lens 110 is a matching one, the processing operation proceeds to Step S44.

In Step S43, it is determined if the interchangeable lens 110 mounted on the camera body 30 is properly matching or not. Subsequently, in Step S45, a proper sequence of operation is conducted for the camera.

Thereafter, a normal processing operation is conducted for the purpose of operating the camera. In this normal processing loop, if the interchangeable lens 110 is released from the camera body 30 or not is checked at regular time intervals by the lens mounting/releasing switch 22 in Step S46.

If it is determined that the interchangeable lens 110 is not released, the processing operation proceeds to Step S47, where it is determined if a command for checking the lens is issued by the user or not. If it is determined in Step S47 that a command for checking the lens is issued, the processing operation goes to Step S34 for a lens checking operation which is conducted in a manner as described above. On the other hand, if it is determined in Step S47 that no command is issued for checking the lens, a normal processing operation is conducted in Step S48. Then, the processing operation goes to Step S46 for the normal processing loop.

If it is detected by the lens mounting/releasing switch 22 in Step S46 that the interchangeable lens 110 is released from the camera body 30, the processing operation proceeds to Step S49. In Step S49, it is determined if an interchangeable lens 110 is mounted on the camera body 30 again or not.

If it is determined that an interchangeable lens 110 is mounted on the camera body 30 again, the processing operation goes back to Step S33. If, on the other hand, it is determined that no interchangeable lens 110 is mounted, the processing operation proceeds to Step S50 in order to deal with a situation where no interchangeable lens 110 is mounted. Thereafter, the processing operation returns to Step S49 and the camera body waits for an interchangeable lens 110 to be mounted on it.

Figure 13:
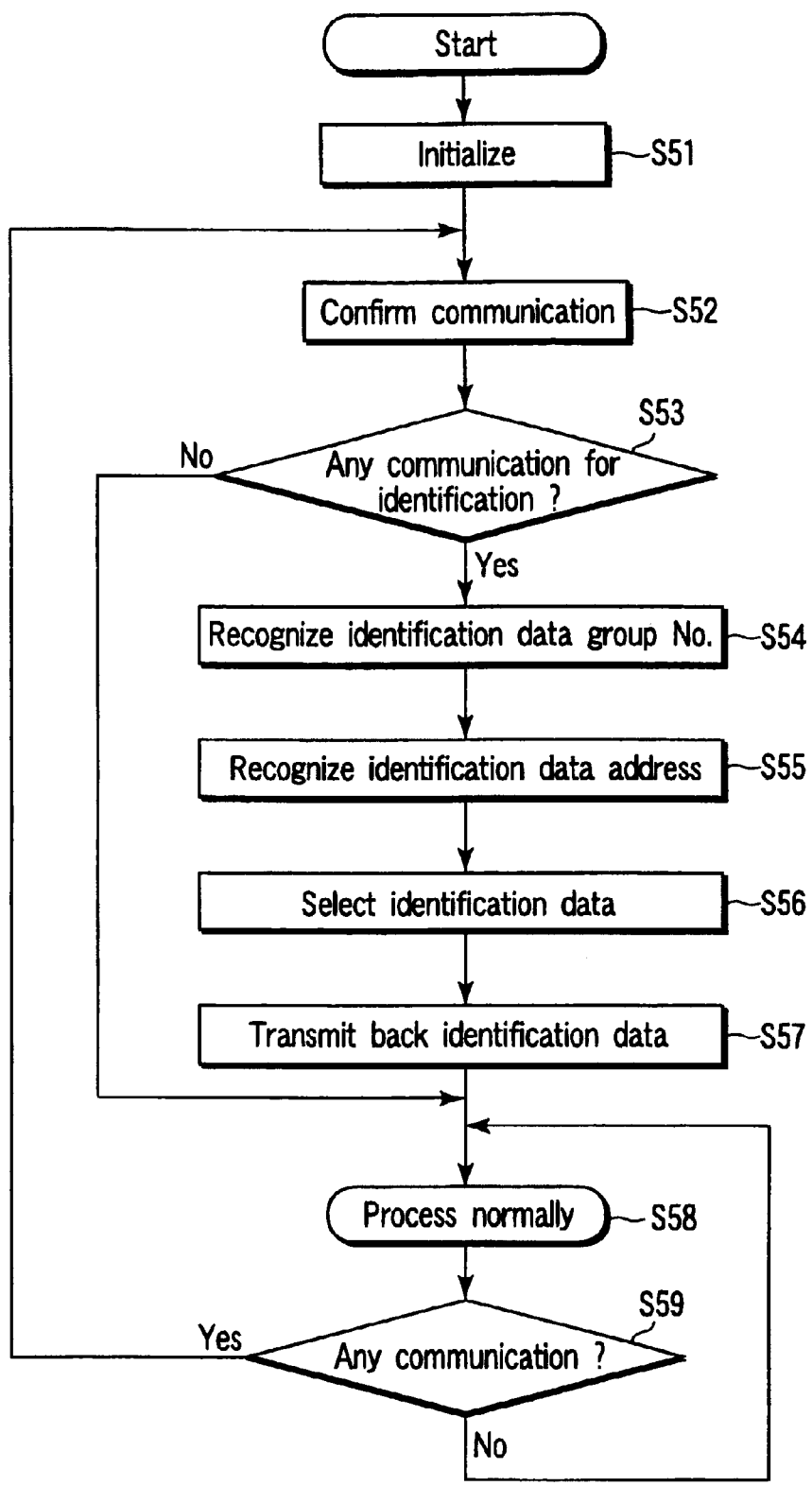
FIG. 13 is a flow chart of the operation of the interchangeable lens of the second embodiment of the invention.

Now, the processing operation on the part of the interchangeable lens 110 will be described by referring to the flow chart of FIG. 13.

This processing operation is started when the interchangeable lens 110 is connected to the camera body 30.

As the processing operation starts, firstly the interchangeable lens 110 is initialized in Step S51. The initialization may typically include selection of a port. Then, in Step S52, the interchangeable lens 110 waits for a notification of a data communication to be conducted that is transmitted from the communicating section 12 of the camera body 30 and received by the communicating section 102.

Then, in Step S53, it is determined if the received notification of a data communication is for an identification data or not. If it is determined that the received notification is for an identification data, the processing operation proceeds to Step S54, where the group number transmitted from the camera body 30 in Step S35 is received and recognized.

Thereafter, in Step S55, Addresses X and Y of the identification data transmitted from the camera body 30 in Step S36 are received and recognized. Then, in Step S56, the recognized group number and Addresses X and Y of the identification data are read out from the identification data storage section 16. Additionally, in Step S57, the read out identification data is transmitted back to the communicating section 12 of the camera body 30 from the communicating section 102.

If it is determined that the operation of Step S57 is terminated or the notification of a data communication is determined to be not for an identification data in Step S53, the ordinary processing operation for driving the lens is conducted in Step S58.

During the ordinary processing operation, it is determined in Step S59 if the camera body 30 requests a communication or not at regular time intervals. If it is determined that the camera body 30 requests a communication, the processing operation goes to Step S52 for the above described operation. If, on the other hand, it is determined that the camera body 30 does not request any communication, the ordinary processing loop is resumed.

Thus, the second embodiment of the invention is adapted to accurately recognize if the interchangeable lens mounted on the camera body is a properly matching one or not. Additionally, the camera system can be driven to operate only when a properly matching interchangeable lens that is accurately recognized to be as such is mounted on the camera body of the camera system to remarkably improve the reliability of the entire camera system.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A camera system comprising:

a camera body; and an accessory device to be releasably mounted on the camera body;

wherein the camera body comprises a camera side identification data table, a specifying section which specifies an appropriate data address to the accessory device, and a judging section;

wherein the accessory device comprises an accessory device side identification data table congruous with the camera side identification data table, and a transmitting section which transmits the identification data stored in the accessory device side identification data table at the data address specified by the specifying section to the camera body; and wherein the judging section is adapted to determine if a dedicated accessory is mounted by comparing the identification data transmitted back from the accessory device and the identification data stored in the camera side identification data table at the address corresponding to the data address.

2. The camera system according to claim 1, wherein each of the camera body and the accessory device comprises a plurality of identification data tables and wherein the camera body specifies one of the plurality of identification data tables and an appropriate address of the specified table to the accessory device.

3. The camera system according to claim 1, wherein the accessory device comprises an interchangeable lens that is releasably mounted on the camera body.

4. The camera system according to claim 1, wherein the accessory device comprises a flash unit that is releasably mounted on the camera body.

5. The camera system according to claim 1, wherein the accessory device comprises a battery pack that is releasably mounted on the camera body.

6. An accessory device to be releasably mounted on a camera body having a functional feature of determining if an accessory device dedicated to the camera body is mounted thereon, the accessory device comprising:
   an identification data table held congruous with a camera side identification data table provided in the camera body; and
   a transmitting section which selects an identification data in the identification data table and transmits the selected identification data to the camera body in response to a specification by the camera body.

7. The accessory device according to claim 6, wherein the accessory device comprises an interchangeable lens that is releasably mounted on the camera body.

8. The accessory device according to claim 6, wherein the accessory device comprises a strobe unit that is releasably mounted on the camera body.

9. The accessory device according to claim 6, wherein the accessory device comprises a battery pack that is releasably mounted on the camera body.

10. A camera body having a functional feature of determining if an accessory device designed to be dedicated to the camera body is mounted thereon, the camera body comprising:
   an identification data table congruous with an accessory side identification data table held by the accessory device;
   a specifying section which specifies an appropriate data address to the accessory device; and
   a judging section which determines if the dedicated accessory device is mounted by comparing (i) identification data corresponding to the specified data address of the accessory side identification data table and transmitted back from the accessory device according to a specification by the specifying section, and (ii) identification data stored in the camera side identification data table at an address corresponding to the specified data address.

11. The camera body according to claim 10, wherein the accessory device comprises an interchangeable lens that is releasably mounted on the camera body.

12. The camera body according to claim 10, wherein the accessory device comprises a strobe unit that is releasably mounted on the camera body.

13. The camera body according to claim 10, wherein the accessory device comprises a battery pack that is releasably mounted on the camera body.

14. A camera system comprising:
   a camera body; and
   an accessory device to be releasably mounted on the camera body;
   wherein the camera body comprises a camera side memory section storing identification data, a detecting section which detects a predetermined operation by a user, a comparing section, and a judging section;
   wherein the accessory device comprises an accessory device side memory section storing identification data congruous with the identification data stored in the camera side memory section;
   wherein the comparing section is arranged in the camera body to receive identification data from the accessory device when the predetermined operation is detected by the detecting section, and to compare the received identification data with corresponding camera side identification data;
   wherein the judging section is adapted to judge if the dedicated accessory device is mounted on the camera body according to a result of comparison by the comparing section;
   a specifying section arranged in the camera body to specify an appropriate data address to the accessory device when the predetermined operation is detected by the detecting section; and
   a transmitting section arranged in the accessory device to transmit an identification data stored in the accessory device side memory section to the camera body according to the specified data address.

15. The camera system according to claim 14, wherein each of the camera side memory section and the accessory device side memory section comprises a plurality of data tables formed by a plurality of identification data, and wherein the camera body specifies one of the plurality of data tables and an appropriate address of the specified table to the accessory device.

16. The camera system according to claim 14, wherein the accessory device comprises an interchangeable lens that is releasably mounted on the camera body.

17. The camera system according to claim 14, wherein the accessory device comprises a strobe unit that is releasably mounted on the camera body.

18. The camera system according to claim 14, wherein the accessory device comprises a battery pack that is releasably mounted on the camera body.

19. A camera system comprising:
   a camera body; and
   an accessory device
   wherein the camera body comprises a communicating section which communicates with a specific accessory device according to a predetermined communication protocol, and a discriminating section which determines if the accessory device coupled thereto holds a predetermined quantity indicating a state of a pre-selected electric phenomenon; and
   wherein the accessory device comprises a holding section which holds the predetermined quantity indicating the state of the pre-selected electric phenomenon in a form recognizable to the discriminating section of the camera body.

20. The camera system according to claim 19, wherein the quantity indicating the state of the electric phenomenon is selected to maintain a specific relationship with an attribute of the accessory device.

21. The camera system according to claim 20, wherein the accessory device comprises an interchangeable lens, and the attribute of the interchangeable lens relates to a focal length thereof.

22. The camera system according to claim 20, wherein the attribute of the accessory device relates to a physical quantity for identifying an individual accessory device which is provided in the accessory device in advance.

23. The camera system according to claim 20, wherein the attribute of the accessory device relates to a product number.

24. The camera system according to claim 19, wherein the quantity indicating the state of the electric phenomenon comprises an electric current value.

25. The camera system according to claim 19, wherein the quantity indicating the state of the electric phenomenon comprises a voltage value.

26. The camera system according to claim 19, wherein the quantity indicating the state of the electric phenomenon comprises an electric resistance value.

27. The camera system according to claim 19, wherein the quantity indicating the state of the electric phenomenon comprises an electric capacitance value.

28. The camera system according to claim 19, wherein the quantity indicating the state of the electric phenomenon comprises a frequency value.

29. The camera system according to claim 19, wherein the quantity indicating the state of the electric phenomenon comprises a duty factor of an electric value that changes cyclically.

30. The camera system according to claim 19, wherein the camera body further comprises a coding section which encodes a command relating to the quantity indicating the state of the electric phenomenon and transmits it to the accessory device connected thereto, and wherein the accessory device further comprises a decoding section which decodes the coded command transmitted from the camera body and selects the quantity indicating the state of the electric phenomenon according to the decoded command.

31. A camera body applicable to a camera system of a combination of a camera body and an accessory device, the camera body comprising:

a communicating section which communicates with a specific accessory device according to a predetermined communication protocol; and a discriminating section which determines if the accessory device coupled to the camera body holds a predetermined quantity indicating a state of a pre-selected electric phenomenon.

32. The camera body according to claim 31, wherein the quantity indicating the state of the electric phenomenon is selected to maintain a specific relationship with an attribute of the accessory device.

33. The camera body according to claim 32, wherein the accessory device comprises an interchangeable lens, and the attribute of the interchangeable lens related to a focal length thereof.

34. The camera body according to claim 32, wherein the attribute of the accessory device relates to a physical quantity for identifying an individual accessory device which is provided in the accessory device in advance.

35. The camera body according to claim 32, wherein the attribute of the accessory device relates to a product number.

36. An interchangeable lens applicable to a camera system of a combination of a camera body and an interchangeable lens, the interchangeable lens comprising:

a holding section which holds a predetermined quantity indicating a state of a pre-selected electric phenomenon in a form recognizable to a discriminating section arranged in the camera body.

37. The interchangeable lens according to claim 36, wherein the quantity indicating the state of the electric phenomenon is selected to maintain a specific relationship with an attribute of the interchangeable lens.

38. The interchangeable lens according to claim 37, wherein the attribute of the interchangeable lens relates to a focal length thereof.

39. The interchangeable lens according to claim 37, wherein the attribute of the interchangeable lens relates to a physical quantity for identifying the interchangeable lens which is provided in the interchangeable lens in advance.

40. The interchangeable lens according to claim 37, wherein the attribute of the interchangeable lens relates to a product number.

41. A camera body applicable to a camera system of a combination of a camera body and an accessory device, the camera body comprising:

a communicating section which communicates with a specific accessory device according to a predetermined communication protocol;

a first matching determining section which acknowledges possession of a first matching property of the accessory device when communication is established by way of the communicating section;

a second matching determining section which detects a quantity indicating a state of a pre-selected electric phenomenon held by the accessory device and acknowledges possession of a second matching property of the accessory device when a result of detection agrees with a predetermined quantity indicating the state of the pre-selected electric phenomenon; and a control section which determines possession of the first and second proper matching properties of the accessory device and allows the camera to operate when the first matching determining section acknowledges the possession of the first matching property and the second matching determining section acknowledges the possession of the second matching property.

42. The camera body according to claim 41, wherein the control section determines that the accessory device has no proper matching properties in a case that it is determined that the accessory device does not have at least one of the first matching property and the second matching property, and wherein the control section thereafter prohibits any camera operation when it is determined that the accessory device has no proper matching properties.

43. The camera body according to claim 41, wherein the possession of the first matching property is determined by collating code tables.

44. An interchangeable lens applicable to a camera system of a combination of a camera body and an interchangeable lens, the interchangeable lens comprising:

a lens side communicating section capable of communicating with the camera body according to a predetermined communication protocol, wherein the interchangeable lens is acknowledged to possess a first matching property by a first matching determining section arranged in the camera body when communication is established between the lens side communicating section and the camera body; and a state-indicating quantity holding section which holds a quantity indicating a state of a pre-selected electric phenomenon, wherein the quantity indicating the state of the pre-selected electric phenomenon is apt to be detected by a second matching determining section arranged in the camera body, and the interchangeable lens is acknowledged to possess a second matching property by the second matching determining section when the detected quantity indicating the state of the pre-selected electric phenomenon agrees with a predetermined quantity.

45. A camera system comprising:

a camera body; and an interchangeable lens to be mounted on the camera body;

wherein the camera body comprises a camera side communicating section, a first matching determining section, a second matching determining section, and a control section;

wherein the interchangeable lens comprises a lens side communicating section, and a state-indicating quantity holding section;

wherein the camera side communicating section is apt to communicate with a specific accessory device according to a predetermined communication protocol;

wherein the lens side communicating section is apt to communicate with the camera side communicating section according to the predetermined communication protocol;

wherein the first matching determining section is adapted to acknowledge possession of a first matching property of the mounted interchangeable lens when communication is established between the camera side communicating section and the lens side communicating section;

wherein the state-indicating quantity holding section is adapted to hold a quantity indicating a state of a pre-selected electric phenomenon;

wherein the second matching determining section is adapted to detect a quantity indicating the state of the pre-selected electric phenomenon held by the state-indicating quantity holding section and acknowledge possession of the second matching property of the interchangeable lens when a result of detection agrees with a predetermined quantity indicating the state of the pre-selected electric phenomenon; and wherein the control section is adapted to determine the possession of the first and second proper matching properties of the interchangeable lens and allow the camera to operate when the first matching determining section acknowledges the possession of the first matching property and the second matching determining section acknowledges the possession of the second matching property.

46. The camera system according to claim 45, wherein the control section determines that the interchangeable lens has no proper matching properties in a case that it is determined that the interchangeable lens does not have at least one of the first matching property and the second matching property, and wherein the control section thereafter prohibits any camera operation when it is determined that the accessory device has no proper matching properties.

47. The camera system according to claim 45, wherein the possession of the first matching property is determined by collating code tables.

* * * * *